United States Patent [19]
Combeau

[11] Patent Number: 5,232,200
[45] Date of Patent: Aug. 3, 1993

[54] BALL VALVE

[76] Inventor: Alberto Combeau, Estado 235, of. 511, Santiago, Chile

[21] Appl. No.: 778,752

[22] Filed: Oct. 18, 1991

Related U.S. Application Data

[63] Continuation of Ser. No. 584,930, Sep. 19, 1990, abandoned.

[30] Foreign Application Priority Data

Sep. 20, 1989 [AR] Argentina .................... 314971

[51] Int. Cl.⁵ ............................................. F16K 5/06
[52] U.S. Cl. ........................................ 251/315; 251/317
[58] Field of Search ............................. 251/315, 317

[56] References Cited

U.S. PATENT DOCUMENTS

| | | | |
|---|---|---|---|
| 2,839,266 | 6/1958 | Kaiser | 251/315 X |
| 2,912,219 | 11/1959 | Clade | 251/315 |
| 2,963,262 | 12/1960 | Shafer | 251/315 X |
| 3,083,945 | 4/1963 | Shafer et al. | 251/315 X |
| 3,462,120 | 8/1969 | Priese | 251/315 |
| 3,556,471 | 1/1971 | Paul, Jr. | 251/315 X |
| 3,677,514 | 7/1972 | Mencarelli | 251/315 X |
| 4,141,538 | 2/1979 | Bake et al. | 251/315 |
| 4,177,972 | 12/1979 | Legris | 251/315 X |

FOREIGN PATENT DOCUMENTS 1154319 9/1963 Fed. Rep. of Germany ...... 251/315

Primary Examiner—John C. Fox
Attorney, Agent, or Firm—Shlesinger, Arkwright & Garvey

[57] ABSTRACT

An improved ball valve for fluids, comprising a body composed of a main and lateral body which defines a longitudinal duct in which there is an obstructing ball having a cylindrical perforation, so that said ball may rotate around a stem joined to it so as to align said cylindrical perforation with said longitudinal duct; said ball being supported by two ring-shaped seats. Whereby the improvements are centered on the independency of the present functions of the seats rings: as ball supports and sealing elements; said rings being left, in accordance with the invention, related solely to the ball-supporting function and introducing a pair of elastic rings (O-rings) which perform the role of sealing elements.

3 Claims, 3 Drawing Sheets

5,232,200

BALL VALVE

This application is a continuation of application Ser. No. 07/584,930, filed Sep. 19, 1990 now abandoned.

This invention relates to ball valves which, in general, are useful in fluid pipe networks since they stand large pressures and a wide range of temperatures, without a noticeable variation of their performance. An additional advantageous characteristic of said valves lies in their practically negligible pressure drop in a state of maximum opening, in contrast with other types of valves. This particular type of valve has also the particularity of providing swift maneuverability since a 90-degree turn of the handle will suffice to change it from an open to a closed condition.

BACKGROUND OF THE INVENTION

Ball valves basically consist of a body comprising a longitudinal duct for the fluid flow, in the center of which a ball is tightly interposed; having said ball a cylindrical perforation which is axial to the fluid flow when the valve is in a fully open condition. Said ball is joined to an actuating stem which is perpendicular to both the duct and the cylindrical perforation. Thus, the actuating stem allows the rotation of the ball from an obstructing position with its perforation perpendicular to the duct to its fully open condition, by means of a 90-degree turn, with its perforation coaxial to the duct.

Due to the fact that the ball is sustained between two ring-shaped seats which, traditionally, perform as ball supports as well as sealing elements, this type of valve presents inconveniences restricting its fluid-tightness efficiency when subjected to temperature changes (although to a lesser degree than in other types of valves), because of the different thermal expansion coefficients possessed by the valve bodies, the seats, and the ball. This traditional design aspect also restricts the usage lifetime of the valve when it is used in positions intermediate to the fully open and closed conditions, because the ring-shaped seats become partially worn out and, since said seats also act a sealing elements, the fluid-tightness of the valve becomes impaired.

SUMMARY OF THE INVENTION

The present invention relates to certain improvements introduced in the ball-type valves. The observation of the inconveniences of traditional ball valves shows that said inconveniences are caused by the restriction existing in the selection of materials for the manufacturing of the ring-shaped seats because said materials must be somewhat elastic to act as a seal but they must also possess some rigidity to act as sets. Because of this fact, the improvement of this invention basically consists in making the supporting of the ball independent from its sealing function. For this purpose, and as it will be further detailed, elastic rings (O-ring type) have been conveniently positioned so that they become in charge of sealing the surface between the ring-shaped seats and the body of the valve; said seats remaining only as structural supports on the ball.

Therefore, the present invention allows the choice, with a greater amplitude of the materials for the valve body, ring-shaped seats and the ball, seeking those with equal or similar thermal expansion coefficients, a fact that results in a better fluid-tightness efficiency, an economy of materials and in an improved sealing relationship, even if the ring-seats undergo a certain degree of wearing out.

An objective of the present invention is to provide a ball valve with an independent supporting function of its seats with respect to the sealing function around the ball.

Another objective of this invention is to provide an improved ball valve in which various materials may be utilized for its manufacturing without having its fluid-tightness affected by temperature changes.

A further objective of this invention is to provide an improved ball valve which does not lose its fluid-tightness when its seats have undergone wearing out due to usage.

BRIEF DESCRIPTION OF THE DRAWINGS

To better understand the improvements introduced by this invention, a detailed explanation will be made with reference to the embodiment example, in which equal or equivalent parts are marked by the same numerals and in which.

DETAILED DESCRIPTION OF THE DRAWINGS

Figure 1:
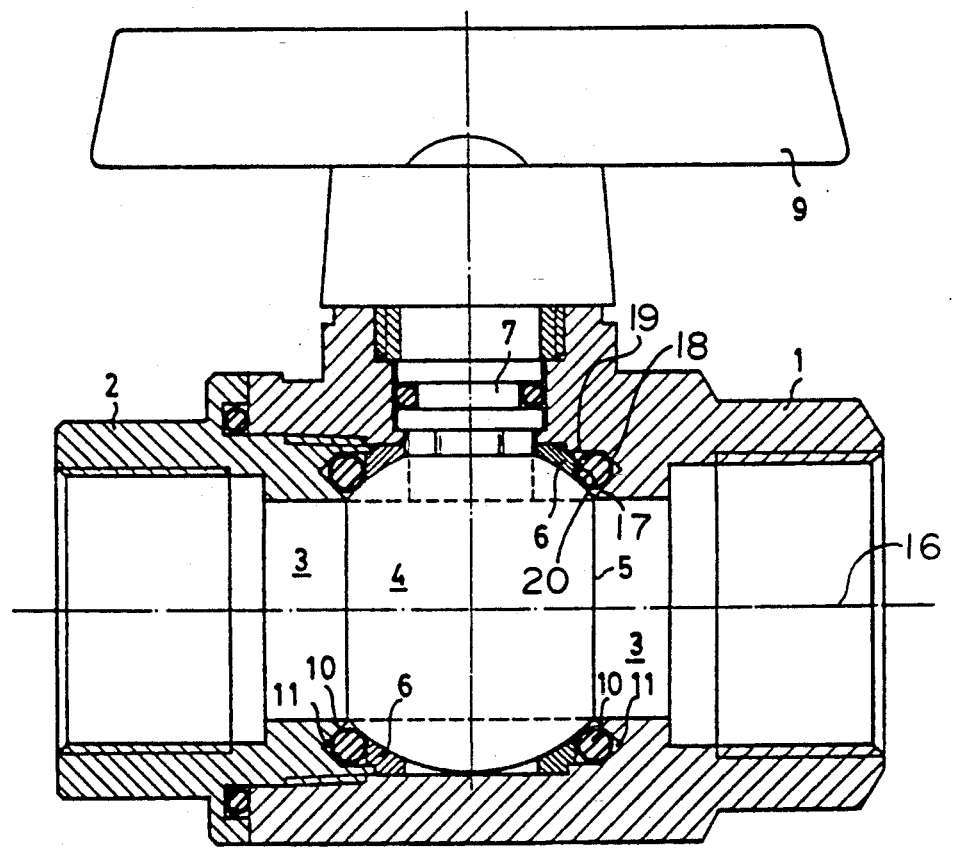
FIG. 1 represents an elevation view in cross section of a ball valve, in an open position, which includes the improvement of the invention.
Figure 2:
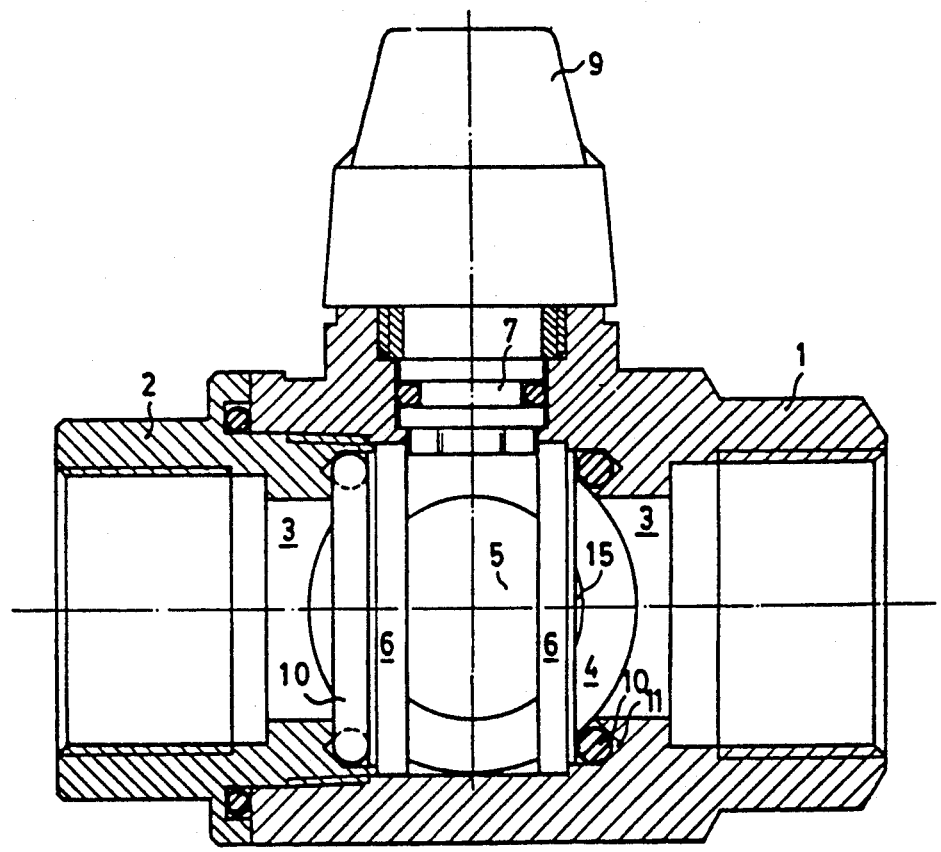
FIG. 2 illustrates an elevation view in cross section of the same valve as in FIG. 1, but in a closed position.

As it may be observed in FIGS. 1 and 2 the valve is integrated, the same as in the traditional types, by a valve body composed of a main body 1 and a lateral body 2 which, when removed, allow free-access to the inner part of the valve for its assembly, clean-up or repair. The set formed by the main body 1 and the lateral body 2 has a longitudinal duct 3 for the fluid flow; said duct 3 having an obstructing ball 4 interposed, which presents a cylindrical perforation 5 susceptible to being coaxially oriented to duct 3. Said ball 4 rotates by means of a stem 7 which is connected to the outside of the valve through handle 9. The duct 3 has a longitudinal axis 16.

Obstructing ball 4 is limited, on each side of duct 3, by means of both ring-shaped seats 6. In traditional valves, these ring-shaped seats are made with a material having special physical properties (generally teflon) so that said seats may comply with their twofold function: as structural support of ball 4 to prevent its axial deviations and as a fluid-tight seal between the ball and the valve body.

It is in this part where this invention makes an important contribution in making independent the two above-mentioned functions, by utilizing elastic rings (or O-rings) 10, located in contact with ring-shaped seats 6, through the external planes, and in contact with cap portions of ball 4; said elastic rings 10 being seated in respective perimetrical ring-shaped slots 11 made in main body 1 and lateral body 2, in such a way that said slots 11 are oriented with their concavities in an axial form, facing each other. With a slot arrangement such as this, the elastic seals 10 are kept in contact with the zone intersecting the external part of the ring-shaped seats 6 with the ball surface so that said slots 11 are oriented with their concavities in an axial form and facing each other. Each of the slots 11 is defined by walls 17, 18 and 19. Each of the seats 6 has a wall 20 that is disposed across its respective slot 11, thereby to secure the respective seal 10 therein. Each wall 20 is disposed substantially transversely to the axis 16.

The operation of elastic seals 10 is not based on their axial but on their radial compression. For this purpose, their diameter is slightly larger than the diameter of the ring-shaped slots 11 and the mechanical properties of said elastic rings 10 are such that they behave as fluid bodies. The latter explanation, however, does not constitute a part of this invention since it corresponds to the basic operation principle of O-rings.

FIG. 2 pictures the valve already shown in FIG. 1, but now in a closed position. To emphasize the non-sealing function of the ring-shaped seats 6, an elastic ring 10 (the one on the left) has been illustrated as a whole while the other ring 10 (on the right) has been sectioned to show that, even though seat 6 allows a slight gap 15 with the cylindrical perforation 5 of ball 4, the sealing is efficiently accomplished through elastic rings 10 which remain in contact with seats 6 and the cap zones of ball 4.

Figure 3:
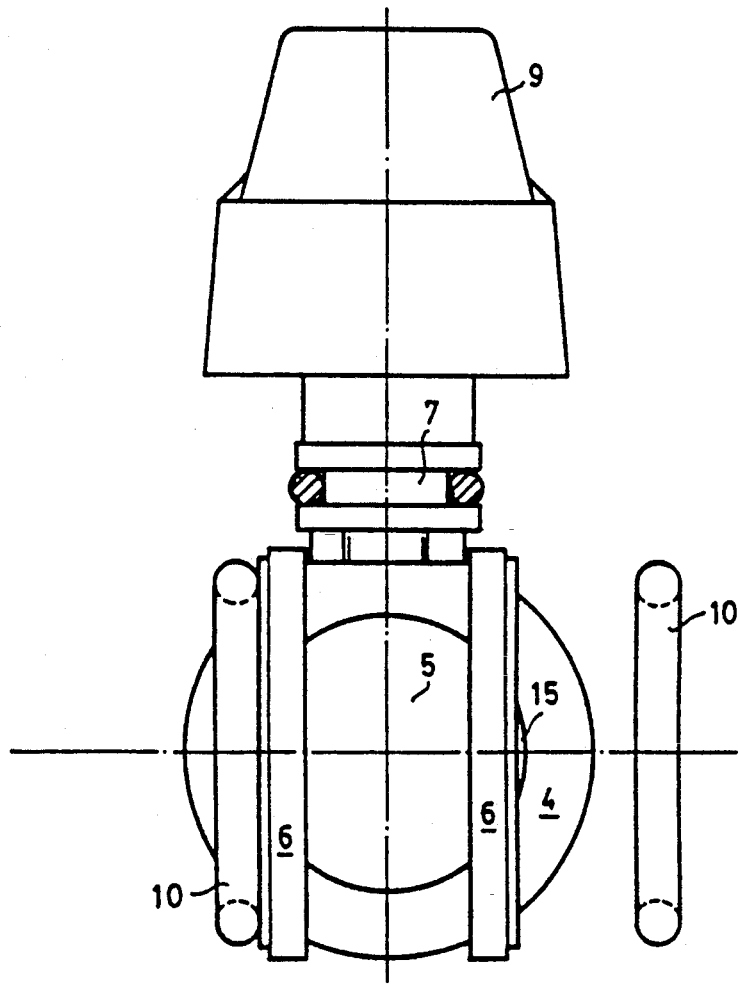
FIG. 3 shows some isolated elements of FIG. 2 which allow a better appreciation of the improvements according to this invention.

FIG. 3 reiterates this situation showing only the essential elements of this invention, wherein the elastic ring 10 of the right side has been displaced to show the gap 15, the object of which is merely to illustrate the additional advantage of this invention in admitting a larger than normal diameter of the perforation 5 of the ball 4; if required.

What is claimed is:

1. A ball valve for fluids, comprising:
   a) a unitary main body;
   b) a unitary lateral body secured to said main body for defining a longitudinal duct with said main body;
   c) a ball disposed within said duct, said ball having an opening therethrough for cooperating with said duct, said ball having an outside surface;
   d) first and second ring-shaped seats secured within said duct and spaced apart from each other for rotatably supporting said ball;
   e) said ball having an open position wherein said opening communicates with said duct and a closed position wherein said outside surface is disposed across said duct;
   f) said main and lateral bodies including first and second integral annular slots, respectively, communicating with said duct;
   g) first and second "O"-rings disposed outboardly of respective said seats and within respective said slots in sealing contact with respective said seats, said outside surface and respective said main and lateral bodies, said "O"-rings each having a circular radial cross-section;
   h) each of said seats having a wall disposed across respective said slots such that respective said "O"-rings are substantially enclosed therein;
   i) each of said slots including first, second and third walls integral with respective said main and lateral bodies;
   j) each of said seats being disposed such that said seat wall extends away from said third wall;
   k) said main and lateral bodies including integral first and second shoulders, respectively; and
   l) said first and second seats including first and second recesses, respectively, that cooperate with said first and second shoulders, respectively 2. A ball valve as in claim 1, wherein:
   a) said duct has a longitudinal axis; and
   b) said wall is disposed substantially transversely to said axis.

3. A ball valve as in claim 1, wherein:
   a) said seats, said ball and said main and lateral bodies have identical coefficients of expansion.

* * * * *